(12) United States Patent
Mantese et al.

(10) Patent No.: US 7,564,021 B2
(45) Date of Patent: Jul. 21, 2009

(54) PYROELECTRIC SENSOR

(75) Inventors: Joseph V. Mantese, Shelby Township, MI (US); Norman W. Schubring, Troy, MI (US); Adolph L. Micheli, Harrison Township, MI (US); Carlos Paz De Araujo, Colorado Springs, CO (US); Larry McMillan, Colorado Springs, CO (US); Jolanta Celinska, Colorado Springs, CO (US)

(73) Assignee: Delphi Technologies, Inc., Troy, MI (US)

( * ) Notice: Subject to any disclaimer, the term of this patent is extended or adjusted under 35 U.S.C. 154(b) by 143 days.

(21) Appl. No.: 10/546,613

(22) PCT Filed: Feb. 20, 2004

(86) PCT No.: PCT/US2004/005100

§ 371 (c)(1),
(2), (4) Date: Nov. 27, 2006

(87) PCT Pub. No.: WO2004/076991

PCT Pub. Date: Sep. 10, 2004

(65) Prior Publication Data

US 2007/0108385 A1    May 17, 2007

Related U.S. Application Data

(60) Provisional application No. 60/449,505, filed on Feb. 21, 2003.

(51) Int. Cl.
*G01J 5/00* (2006.01)
*H01J 40/14* (2006.01)
(52) U.S. Cl. .................. 250/214 R; 250/338.3
(58) Field of Classification Search ............. 250/214 R, 250/338.2, 338.3
See application file for complete search history.

(56) References Cited

U.S. PATENT DOCUMENTS 6,294,784 B1 * 9/2001 Schubring et al. ........ 250/338.3
6,514,835 B1 * 2/2003 Hendrix et al. ............ 438/457

* cited by examiner

*Primary Examiner*—Kevin Pyo
(74) *Attorney, Agent, or Firm*—Thomas N. Twomey

(57) ABSTRACT

A pyroelectric sensor for determines a charge output of a ferroelectric scene element of the sensor by measuring the hysteresis loop output of the scene element several times during a particular time frame for the same temperature. An external AC signal is applied to the ferroelectric scene element to cause the hysteresis loop output from the element to switch polarization. Charge integration circuitry is employed to measure the charge from the scene element. The ferroelectric of the scene element is made of strontium bismuth tantalate, or derivative thereof, disposed directly between top and bottom electrodes. The polarization of the reference element which is compared to and subtracted from the polarization of the scene element for each cycle. The polarization difference measured for each cycle over a set time period are summed by an integrating amplifier to produce a signal output voltage.

9 Claims, 6 Drawing Sheets

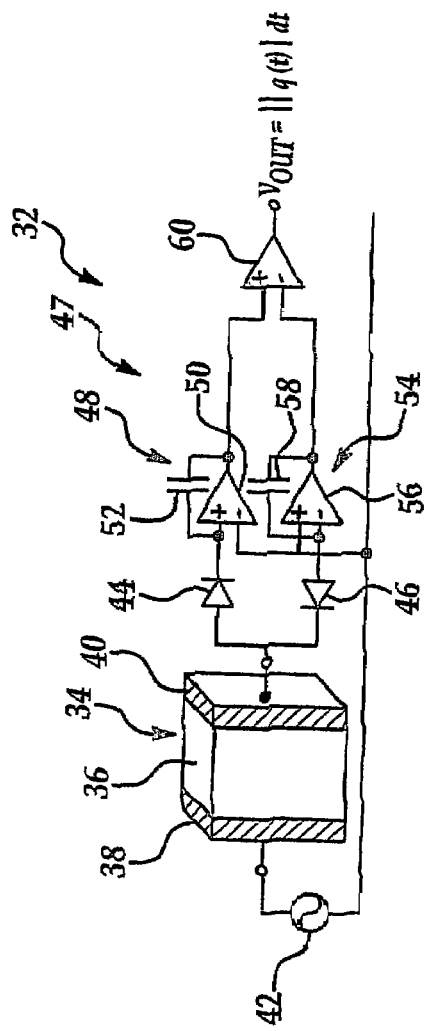
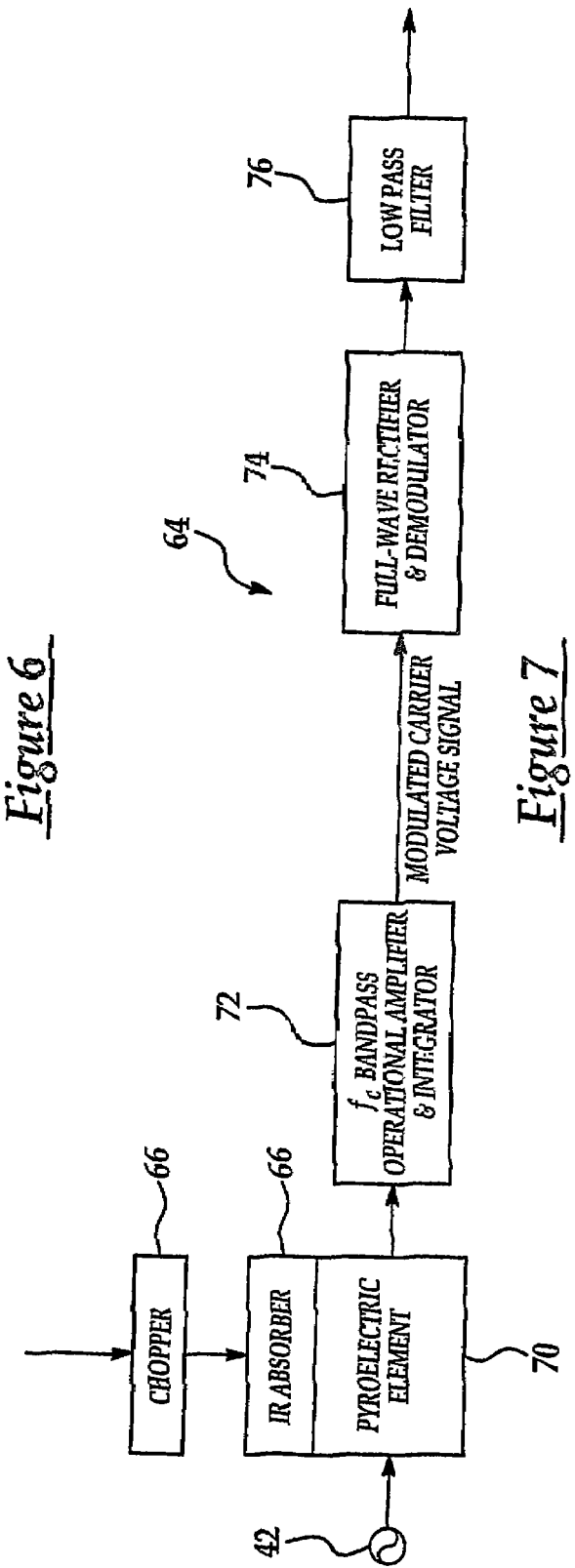

PYROELECTRIC SENSOR

RELATED APPLICATIONS

This patent application claims benefit of U.S. Provisional patent application 60/449,505 filed Feb. 21, 2003.

TECHNICAL FIELD

This invention relates generally to pyroelectric sensors and, more particularly, to a capacitive ferroelectric element of the sensor having a temperature dependent polarization accentuated by the application of an external AC signal to the element and measured by a charge integration system of the sensor.

BACKGROUND OF THE INVENTION

A certain class of sensors configured into an array of pixilated capacitive elements make use of ferroelectric materials, and their pyroelectric effect for detection of temperature change. Sensors of this type have a wide range of applications, such as imaging in low visibility conditions, for example, poor weather conditions, night vision, etc. A ferroelectric material is a dielectric material that has a temperature dependent spontaneous electrical polarization. Each pixel element is thermally sensitive to a portion of a scene to be imaged. The material is thermally biased and referenced by a chopper so that the added or diminished IR energy from the scene either raises or lowers the temperature of the ferroelectric material from a reference temperature preferably at room temperature. This in turn, changes the polarization of the ferroelectric material which is sensed as a momentary current change or alternatively, a voltage change when the change state of a reference capacitor is charged or discharged, dependent upon the temperature of the pixel element. IR imaging is permitted because the individual pixel elements vary their local polarization state due to the IR radiation imparted to them from the scene. The temperature is then reset to the reference temperature via thermal cooling or heating when the chopper is closed isolating the pixel element from the scene.

Generally, known ferroelectric/pyroelectric sensors that convert varying radiation energy to usable electrical signals greater than the inherent ambient noise of the sensor system operate in a "passive mode." This means that the pyroelectric element operates at a given polarization state which is a function of temperature change, without any deliberate electrical polarization reversal (as best shown in FIG. 1). More specifically, passive pyroelectric detection only interrogates the polarization state of the ferroelectric material typically by measuring the net voltage, $\Delta Q$, across a poled capacitor structure wherein $\Delta Q = \Delta P^* A$ and A is the element area, or by small signal AC excitation to determine the permittivity of the material (which is a function of the poled state), or some combination of these two methods.

The practice in the industry to compare ferroelectric/pyroelectric sensors has been to measure the pyroelectric coefficient p, which is defined as the partial derivative of the displacement D with respect to the temperature T, $p=(\Delta D/\Delta T)$ at a given bias field, $E_b$, noting, that $D = \in E + P$ wherein $\in$ is a dielectric constant. What this means is that for a physical geometry having sensor area, A, the amount of coulombs of charge, Q, is generated per temperature, T, and the pyroelectric coefficient, p, is expressed as: $p=(1/A) [\Delta Q/\Delta T]$. Unfortunately, this technique only represents a single cycle around a minor portion of the available signal energy as represented by the hysteresis loop area of FIG. 2.

FIG. 3 shows a schematic block diagram of a known pyroelectric sensor system 10 that employs a conventional passive charge generation technique to determine the output of the sensor element. The sensor system 10 includes a chopper 12 that selectively gates radiation from a scene onto an infrared absorber 14 that is part of a pyroelectric element 16. The pyroelectric element 16 is made of a ferroelectric material that exhibits hysteresis loops which vary with temperature as shown in FIG. 2, and represents a single pixel element of the sensor system 10 that combines with other pixel elements (not shown) to generate an image, as is well understood in the art. The discussion herein is directed to an infrared imaging system, but as will be appreciated by those skilled in the art, sensor systems of this type are applicable to detect other wavelengths of radiation, including millimeter waves and microwaves.

The chopper 12 selectively blocks and passes the radiation directed to the pyroelectric element 16 at a predetermined frequency so that the pyroelectric element 16 sees a reference temperature when the chopper 12 is closed, and sees the temperature of the scene when the chopper 12 is open. The difference between the reference temperature and the scene temperature alters the shape of the hysteresis loop, as shown in FIG. 2. The change in charge Q(t) 18 for the two loops is measured separately as a voltage across a sampling or output capacitor 20 and amplifier 22, in a manner that is well understood in the art. Because no external electric field is applied to the pyroelectric element 16, the measure charge of the pyroelectric element 16 that charges the capacitor 20 for the two loops is the charge $Q_1$ where the hysteresis loop crosses the positive vertical axis for temperature $T_1$ and the charge $Q_2$ where the hysteresis loop crosses the positive vertical axis for temperature $T_2$. The sampling capacitor 20 stores the charge from the pyroelectric element 16 only each time the window is opened by the chopper 12. The effective pyroelectric coefficient p for this design is given as:

$$p=(1/A)[Q_1-Q_2]/[T_1-T_2]$$

In an alternate known design, the small signal level capacitance, (i.e. change in local slope of the Q versus V curve of either a poled or unpoled ferroelectric material) between the charge stored by the pyroelectric element 16 is measured for temperature $T_1$ and $T_2$ and then compared. FIG. 4 shows a schematic block diagram of a sensor system 26 including the chopper 12, the infrared absorber 14, the pyroelectric element 16 and the amplifier 22. Sometimes a small bias voltage is applied to the pyroelectric element 16 from a bias source (not shown), and a capacitance meter 28 is used to measure the change in capacitance between the location on the hysteresis loop for both temperatures $T_1$ and $T_2$ relative to the bias voltage. Even though a small bias voltage is applied to the pyroelectric element 16 in this design, the mode of operations is still passive because the small bias voltage does not alter the polarization state of the ferroelectric material in any way, but merely measures its change in local permittivity as measured by a change in capacitance. The effective pyroelectric coefficient p is given as:

$$p=[(V_{mns})/A](\Delta C/\Delta T)$$

As is apparent, this detection scheme utilizes only a small portion of the hysteresis loop, and therefore the sensors are limited in their ability to differentiate signal from noise. Both of the techniques discussed above are dependent upon the condition that the ferroelectric material is left resident in one of its two spontaneous polarization states $P_S$ (+ or −), or some intermediate state thereof. The ability to measure the power from the pyroelectric element 16 between the temperature changes gives the sensitivity of the system. Because the signal-to-noise ratio is relatively low for the prior art sensors, this establishes the sensitivity of the entire system. Robust and relatively expensive system components, such as the chopper 12 and the amplifier 22 cannot increase the signal from noise, but only prevents further degradation.

As illustrated in FIG. 2, the polarization magnitude and direction within the ferroelectric material is identifiable by a hysteresis loop. The orientation of the polarization of the material can be changed by applying a reversing external electric field to the material. The electric dipoles within the material, that identify the orientation of the polarization, change when the external field is applied and in proper circuit layout produce a hysteresis loop. Since spontaneous polarization is generally temperature dependent, ferroelectric materials can employ the pyroelectric effect for temperature detection purposes.

Any area of the hysteresis loop, either the entire saturated hysteresis area or merely a region of operation anywhere within the full loop, is representative of the switching energy required to change the polarization states of some or all the dipoles which make up the atomic lattice structure of the material at a given temperature for the specific state of excitation. Any change in radiation incident of the ferroelectric material, if absorbed, changes the temperature, and thus changes the associate loop area. FIG. 2 shows two charges versus voltage hysteresis loops for a particular pyroelectric material at a first temperature $T_1$ and a second temperature $T_2$. If plotted independent of physical dimensions, the magnitude of an externally applied alternating electric field is given on the horizontal axis and polarization, in charge density, is given on the vertical axis. The area of the charge versus voltage hysteresis loop of a ferroelectric material has dimensions of energy, and the loop area is a direct function of its temperature. The magnitude of the polarization changes with a change in the temperature of the pyroelectric material for a given electric field. A careful review of the two hysteresis loops in FIG. 2 will show that for the two different temperatures $T_1$ and $T_2$ (with $T_1 < T_2$), the area within the loop is different. Consequently, an electrical measurement of the change in area anywhere within the major loop is an electrical signal corresponding to the change of the temperature of the material, and thus of the incident infrared radiation. The effect is of a dynamic nature due to the switching between polarization states of the pyroelectric material, and therefore, when measuring incident radiation, it is necessary to shutter the radiation, to reference the ferroelectric spontaneous polarization before each window opens to the scene.

More recent developments in pyroelectric technology is taught in U.S. Pat. No. 6,294,784 B1, filed Feb. 1, 1999, and U.S. Pat. No. 6,339,221 B1 filed Dec. 3, 1999, both being incorporated herein by reference. These patent disclose an "active" mode of operation as oppose to the traditional "passive" mode previously described. In the active mode, the individual elements are driven by an external voltage to switch between its positive and negative polarization states at a voltage level sufficient to get a significant displacement switching current.

In active mode, each time the polarization state switches, a charge, $Q_s$, equal to:

$$Q_s = Pr * A$$

will be supplied from this external power source. When the amount of charge delivered is measured, rectified, integrated and amplified via a charge amplifier/integrator 48 of FIG. 6, as taught in the above referenced patents, the total charge accumulated for a preset time period, $\tau$, is (without the amplification factor):

$$Q_{total} = (2 * Q_s) * f * \tau$$

The product of frequency, f, of the external power source times time, (f*$\tau$) is equal to the number of switches, N. As the polarization state is determined by the temperature, $Q_{total}$ is a direct function of temperature. The output signal for each pixel element is the difference between a reference $Q_{ref}$ and $Q_{total}$ taken after the time interval $\tau$, wherein $\tau$ is the duration the chopper is open.

Because the polarization state is sampled multiple times the effective sensitivity of a pyroelectric material is enhanced by a factor of N and the signal to noise ratio averages out random noise, with a reduction factor for the noise component of $1/(f*\tau)^{1/2}$. Unfortunately, to avoid saturation of the signal output voltage, $V_o$, an integrating or output capacitor 52 and 58 must be large enough to handle the total summed charge during the time $\tau$. Thus the capacitance of capacitor 52 must be greater than the product of N times the inherent capacitance of the pyroelectric element 34. Utilizing an output capacitor of sufficient capacitance limits the ability to place the capacitor on the chip and causes the focal point array and supporting circuitry to be larger than desired.

Because material sensitivity is portrayed as the pyroelectric coefficient, p:

$$p = dP_s/dT$$

the reference temperature required to promote sensitivity is best illustrated in FIG. 1 and is located at or near an abrupt change in spontaneous polarization, $P_s$, over a narrow temperature range. Such a temperature is characteristic of the material and is otherwise termed a curie temperature, $T_c$. Curie temperatures are customarily obtained from a plot of the inverse permittivity as a function of temperature and is the high temperature extrapolation to zero inverse permittivity, which represents a phase transition in the material from non-ferroelectric to ferroelectric. Traditionally, the reference temperature, $T_{ref}$, is room temperature, hence, if the curie temperature, $T_c$, is some distance away from room temperature the slope of the line of FIG. 1 designating polarization change decreases which undesirably decreases sensitivity and the pyroelectric coefficient, p.

Within the art of pyroelectrics, a variety of materials are known having curie temperatures, which if used as the reference temperature, can be compatible with supporting structure of any variety of applications, and with a pyroelectric coefficient, p, can meet the desired sensitivity. The tables of known materials referenced from ISAF "92: Proceedings of the Eighth IEEE International Symposium on applications of ferroelectrics, p. 1, are:

| | Normal Pyroelectrics (T < $T_c$) | |
|---|---|---|
| Material | $T_c$ ° C. | P $\mu C/cm^2 K$ |
| Single crystals | | |
| TGS | 49 | 0.028 |
| DTGS | 60 | 0.055 |
| ATGSAs | 51 | 0.07 |
| LiTaO$_3$ | 665 | 0.18 |
| LiNbO$_3$ | 1210 | 0.083 |
| SBN 46/54 | 132 | 0.043 |

-continued

| | | |
|---|---|---|
| PGO:Ba | 70 | 0.032 |
| Ceramics | | |
| PLZT 7/65/35 | 150 | 0.13 |
| PLZT 8/65/35 | 105 | 0.18 |
| PZNFTU | 230 | 0.039 |
| PSZNFTU | 170 | 0.049 |
| PGO | 178 | 0.002 |
| Polymerics | | |
| PVDF | None | 0.0027 |
| Thin Films | | |
| PbTiO$_3$ sol-gel | 490 | 0.0095 |
| PLT 90/10 sputtered | 330 | 0.065 |
| PCT 70/30 sputtered | 270 | 0.05 |
| PZT 54/46 sol-gel | 380 | 0.07 |

Phase Transition Materials (T ≡ $T_{f(c)}$)

| Material | $T_t$° C. | P' max μC/cm$^2$K |
|---|---|---|
| Single crystals | | |
| DTGEB | 74 | 1.4 |
| KTN 67/33 | 4 | 8.0 |
| BST 65/35 | 5 | 0.3 |
| Ceramics | | |
| BST 67/33 | 21 | 23.0 |
| BST 67/33 | 22 | 6.3 |
| BST 67/33 | 24 | 0.70 |
| BST 65/35 | 29 | 0.10 |
| PMN:La | 40 | 0.085 |
| PScT | 40 | 0.38 |
| PZT 94/6* | 50 | 0.37 |
| PZNT 90/8/2* | 30 | 0.185 |
| PCT 70/30:9C0W 96/4 | 106 | 3.0 |
| PLzT 8/60/40 (sic) | 142 | 3.2 |
| PZN/BT/PT 80/10/10** | 12 | 5.93 |
| PZN/BT/PT 80/10/10 | 85 | 2.9 |
| Thin Films | | |
| PScT sputtered | 40 | 0.52 |
| PScT sol-gel | 40 | 0.30 |
| PScT MOCVD | 40 | 0.08 |
| KTN metalorganic | 40 | 20.0 |

Unfortunately, very few of the known materials have curie temperatures near room temperature of approximately 22° C. Moreover, the materials listed above require high temperature processing and require expensive manufacturing processes; some such as BST are hard to grow, some contain lead which is environmentally unfriendly, and still others contain expensive scandium.

Referring to FIG. 5, because IR pyrometry entails temperature sensitive ferroelectric materials, a high thermal time constant representing a high level of thermal isolation of the pixel element is desirable. Any heat transference or cross-talk between pixels or thermal conduction or thermal shorting to the silicon substrate will only serve to lower the thermal time constant hence reduce sensitivity and signal-to-noise ratio. Traditionally, an air gap or bridge provides the necessary thermal isolation between the silicon substrate and a pixel element with only a minimal thermal isolator or spin-on-glass, SOG, connecting the element to the substrate.

Unfortunately, the air bridge concept requires both a silicon manufacturing process and a ceramic process. Moreover, the manufacturing process is expensive, produces a low yield of good arrays, requires inefficient single unit handling and is not capable of wafer-level fabrication. Yet further, the element is limited in size reduction, which is increasingly important when viewing that a typical focal plane array, FPA, typically can have an array of 512×512 pixel elements.

SUMMARY OF THE INVENTION

A ferroelectric/pyroelectric sensor employs a technique for determining a charge output of a ferroelectric scene element of the sensor by measuring the hysteresis loop output of the scene element several times during a particular time frame for the same temperature. An external AC signal is applied to the ferroelectric scene element to cause the hysteresis loop output from the element to switch polarization. Charge integration circuitry, such as a combination output capacitor and operational amplifier, is employed to measure the charge from the scene element. Preferably, the ferroelectric of the scene element is made of an economical and responsive strontium bismuth tantalate, SBT, or derivative thereof, disposed directly between top and bottom electrodes. Because of the frequency characteristics of the sensor, created by the external AC signal, the element may not need to be thermally isolated from the silicon substrate by a traditional air bridge, which is difficult to manufacture, and instead is preferably thermally isolated by spin-on-glass, SOG or other suitable low thermal conductance material. To prevent saturation of an output signal voltage of the sensor by excessive charge accumulation in an output capacitor, the sensor preferably has a reference ferroelectric element configured electrically in parallel with the scene element. When the voltage of the AC signal is negative the output capacitor is discharged by flowing current through the reference element thus interrogating the polarization of the reference element, which is compared to and subtracted from the polarization of the scene element for each cycle. The polarization difference measured for each cycle over a set time period are summed by an integrating amplifier to produce a signal output voltage.

Objects, features and advantages of this invention include a pyroelectric sensor having superior noise-to-signal ratio and sensitivity thus enabling use of ferroelectric materials not previously considered for pyroelectric applications, and which have curie temperatures near or significantly above room temperature, are relatively inexpensive, do not require high temperatures to process, and are environmentally friendly and robust.

Moreover, the present invention decreases the dependence upon thermal isolation of the elements of the array from the silicon substrate, hence, the traditional air bridge may not be required thus reducing manufacturing process steps, decreasing cost by producing a higher yield of acceptable arrays, enabling wafer level fabrication, and reducing element size.

Yet further, utilization of a scene element and reference element with corresponding circuitry reduces the necessary output capacitance thus enabling placement of output capacitors on the chip which reduces the overall size of the array and supporting circuitry, enables a greater averaging of cycles thus increasing signal-to-noise ratio and prevents saturation of the signal output voltage.

BRIEF DESCRIPTION OF THE DRAWINGS

The presently preferred embodiments of the invention are disclosed in the following description and accompanying drawings, wherein:

FIG. 6 is a schematic diagram of an active pyroelectric sensor system having a ferroelectric layer made of SBT or a derivative thereof, according to an embodiment of the present invention;

FIG. 7 is a block diagram of another active pyroelectric sensor system of the invention;

DESCRIPTION OF THE PREFERRED EMBODIMENT

Figure 1:
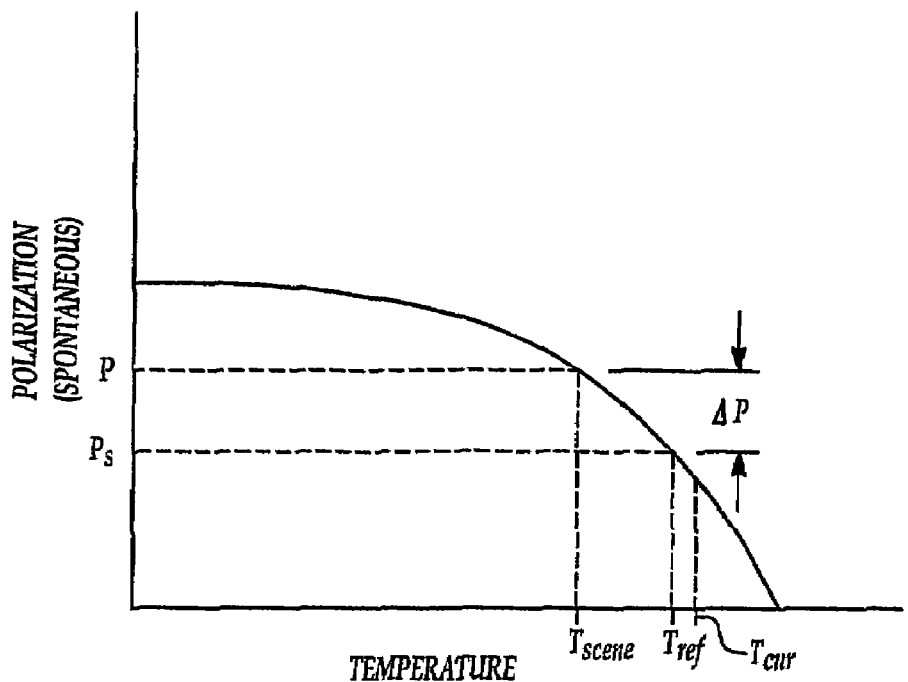
FIG. 1 is a graph with spontaneous polarization on the vertical axis and temperature on the horizontal axis.
Figure 2:
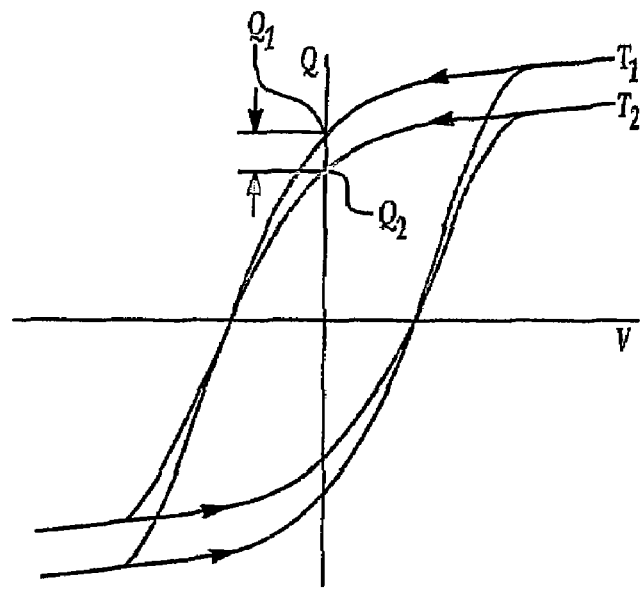
FIG. 2 is a graph with charge on the vertical axis and voltage potential on the horizontal axis showing the hysteresis loop response of a ferroelectric element for both temperature $T_1$ and $T_2$.
Figure 3:
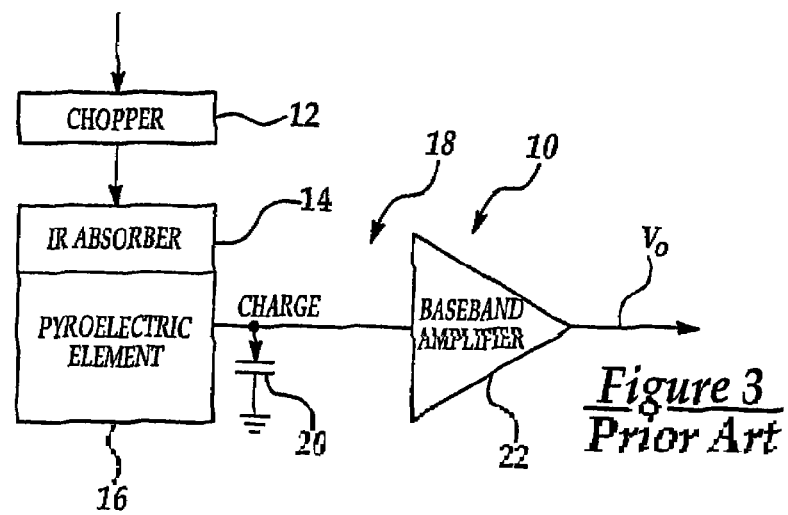
FIG. 3 is a schematic block diagram of a known passive pyroelectric sensor system.
Figure 4:
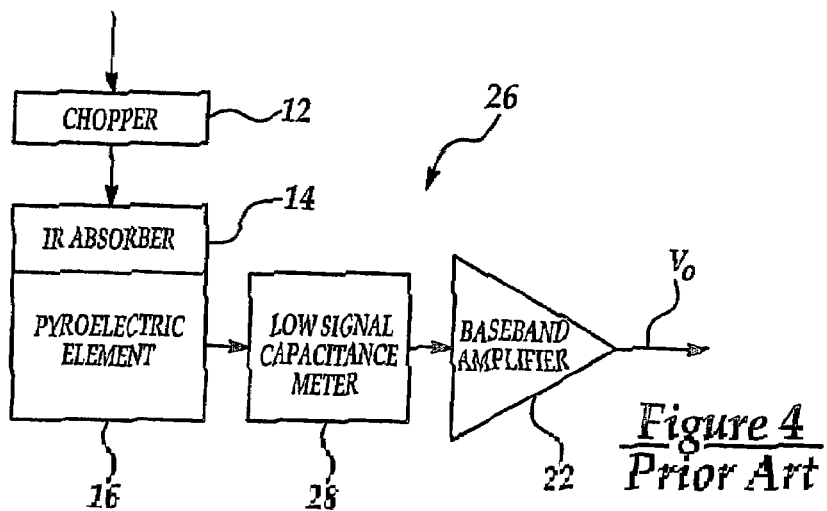
FIG. 4 is a schematic block diagram of another known passive pyroelectric sensor system.

The following description of the preferred embodiments directed to an active pyroelectric sensor system is merely exemplary in nature, and is in no way intended to limit the invention or its applications or uses.

Because the conventional passive pyroelectric sensor designs discussed above do not switch $P_s$ from its initial state during interrogation, closer analysis suggests that the large energy product of the ferroelectric material identified by the hysteresis loop is not typically fully exploited by the industry. The product of the remnant polarization $P_r$ in the fully polarized state, and the coercive electric field $E_c$ required to remove all such residual polarization, is generally identified as the energy product $P_r E_c$. This $P_r E_c$ product has the dimensions of energy density, which serves to compare the "hardness" or energy storage capabilities of such materials. Hence, by employing $P_s$ switching, this invention proposes in-part that the entire hysteresis loop may be traversed numerous times at a given temperature to provide a static measurement with an enhanced signal-to-noise ratio. This rail-to-rail switching of the $P_s$ is tantamount to active operation of the ferroelectric material at a significant power level, as opposed to the very weak levels in the traditional passive or near passive techniques discussed above. As the temperature of the sensor changes, the area within the hysteresis loop changes, and this change can be rapidly monitored due to the active nature of the sensor design.

The area within the hysteresis loop represents the energy dissipated per cycle of excitation. Thus, the continuously alternating excitation of the pyroelectric or ferroelectric material causes dissipation of energy at some equilibrium temperature level. However, this level of dissipation is continuously modulated by the external heat applied to, or drawn from, the sensor (scene energy), and it is this change in equilibrium level that represents the change in temperature in each pixel scene element of the sensor system as required for an electrical output thereof. The loop area difference associated with the two different temperatures $T_1$ and $T_2$ represents stored polarization energy delivered by or received at the ferroelectric energy storage device. This polarization dependent energy change is the difference between the two dissipation energy levels as a result of the cyclical V field excitation. By the active nature of the sensor circuitry of the invention, the accuracy in measurement of this small energy change is enhanced by the frequency of measurement; i.e., bandwidth limiting, signal summing, and noise averaging.

The invention described herein fully exploits all of the temperature-sensitive energy stored in the atomic structure of the pyroelectric material, as accomplished by AC excitation actively traversing the entire saturated major hysteresis loop. This carrier frequency permits signal summing many times per time τ or chopper window. In essence, it is an "active" amplification process in that the external AC excitation is employed to vigorously stimulate all of the energy stored in the lattice of the pyroelectric material, and this high level of the power is now controlled by the minor infrared perturbation signal of the incident radiation.

FIG. 6 is schematic diagram of the pyroelectric sensor system 32, according to an embodiment of the present invention, that provides the active pyroelectric element excitation discussed above with utilization of a ferroelectric layer 36 material not capable of use in a conventional passive pyroelectric system. The system 32 includes a ferroelectric scene element 34 that includes the block or layer 36 of ferroelectric material sandwiched between two electrodes or capacitive plates 38 and 40. An alternating current source 42 applies an alternating voltage potential to the electrode 38 at a predetermined frequency. A chopper 66 (shown in FIG. 7) selectively allows radiant energy from a scene to impinge the block 36 when the shutter is opened, and provide a reference temperature to the ferroelectric scene element 34 when the shutter is closed at a predetermined frequency. The charge generated by the alternating voltage potential from the source 42 and the charge generated by the ferroelectric block 36 from the incident radiation is collected by the electrode 40. The voltage potential from the source 42 is preferably large enough so that the charge drives the hysteresis loop output of the block 36 from an entire loop. As the temperature applied to the pyroelectric element 34 changes in response to the operation of the chopper 66, the shape and area of the hysteresis loop changes accordingly, consistent with the discussion above.

The output voltage collected by the electrode 40 is applied to a first rectifying diode detector 44 and a second rectifying diode detector 46. When the voltage potential from the source 42 is positive, the detector 44 conducts to a charge integrating system 47, and when the voltage potential from the source 42 is negative, the detector 46 conducts to the system 47. When the detector 44 is conducting, the charge from the pyroelectric element 34 is applied to an integrator 48 of the system 47 that includes an amplifier 50 and an integrating or output capacitor 52. Each time the detector 44 conducts, charge is added to the capacitor 52 and is amplified by the amplifier 50. A second integrator 54 of the system 47, has an amplifier 56 and an integrating capacitor 58, which accumulates the charge when the detector 46 is conducting, so that combination of the two integrators 48 or 54 continuously accumulates charge.

A summer 60 of the system 47 is continuously adding the charge from both of the integrators 48 and 54 to provide a summed charge output, $V_o$. An output of the summer 60 is sent to further processing circuitry (not shown) to provide a signal indicative of the one pixel of the image. A reset device (not shown) will reset the summer 60 in sync with the frequency of the chopper 66 if applied. Therefore, for a particular time frame for one temperature, the output from the summer 60 is the charge accumulated over multiple loop swings. In other words, the frequency of the AC source 42 is set so that for each time the chopper 66 is closed, the charge generated by scene element 34 through the hysteresis loop for the temperature $T_1$ will be measured several times. Likewise, when the chopper 66 is opened, the charge generated by the scene element 34 through the hysteresis loop for the temperature $T_2$ is measured the same amount of times. In one embodiment, for example, the AC frequency from the source 42 is set at 1.5 kHz and the chopper period is set at 15 frames per second, giving 100 polarization cycles through the hysteresis loop per chopper window. The summer 60 is zeroed after each time period τ so that the two values can be compared. Therefore, not only does the charge get measured for the entire hysteresis area for a particular chopper time window, but gets measured multiple times over that time period, significantly increasing the signal-to-noise level over the passive sensor described above in the prior art.

The amplitude of the AC signal from the source 42 can be selected to drive the hysteresis loop from rail-to-rail to cover the entire charge available from the pyroelectric element 34. This gives a full polarization reversal of the element 34 for each AC cycle. Alternatively, the amplitude of the AC signal can be reduced to only cover a portion of the hysteresis loop, but the multiple charge measurements during the particular time frame still provides significant signal averaging over those passive pyroelectric sensor systems known in the art. By only covering a portion of the hysteresis loop, the scene element 34 only undergoes a partial polarization reversal. It should be noted that a DC bias can be applied to the element 34 in addition to the AC signal to define a different coverage of the hysteresis loop. As long as the magnitude of the AC signal does not exceed the coercive strength of the loop, which would cause the pyroelectric element 30 to break down, the multiple signal averaging technique of the invention will benefit the signal-to-noise ratio.

FIG. 7 shows a block diagram of an active pyroelectric sensor system 64, according to the invention, showing the operation of the invention as just described. The chopper 66 intermittently applies radiation to an infrared absorber 68 that is part of a ferroelectric scene element 70 in the manner as discussed above. Additionally, a constant amplitude frequency signal is applied to the scene element 70 from the source 42. The charge Q(t) for the full rail-to-rail saturation of the hysteresis loop of the scene element 70 is applied to a $f_c$ bandpass operational amplifier and integrator 72, generally representing the integrators 48 and 54 of the system 47 above. The modulated carrier voltage signal from the integrator is applied to a full-wave rectifier and demodulator 74 representing the detectors 44 and 46 above, and then to a low pass filter 76 to get the electrical output signal, $V_o$.

Figure 8:
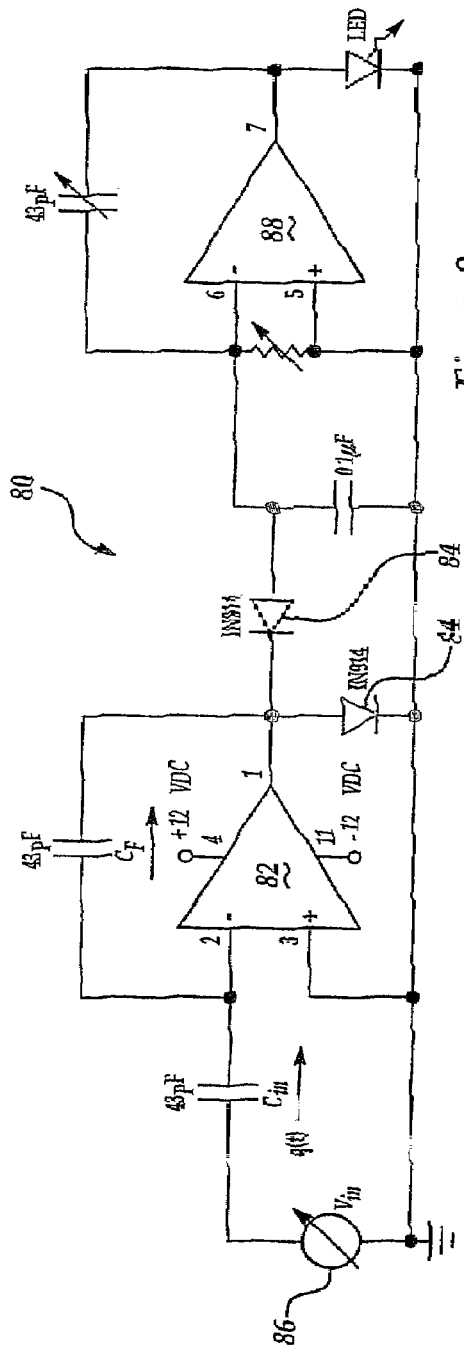
FIG. 8 is a schematic diagram of another active pyroelectric sensor system according to the invention.

FIG. 8 is a schematic diagram of a pyroelectric sensor system 80 according to the invention that is an implementation that exploits all of the generated energy at the sensor by active amplification of the charge of the sensor system 32, discussed above. The system 80 includes a capacitor $C_F$ that accumulates the charge from the scene element, that is amplified by an operational amplifier 82, such as a JFET operational amplifier, TLO84CN. A pair of diode detectors 84 detect the charge from the element, as generated by an AC source 86. An operational amplifier or summer 88 sums the integrated charge. The sensor system 80 provides the same charge accumulation for both the positive and negative components of the AC signal to provide the multiple charge additions over the hysteresis loop.

The discussion above provides signal averaging to increase signal-to-noise ratio in a pyroelectric sensor. Additionally, because the sensor circuitry does not employ many resistors, the Johnson noise of the sensor is further reduced. The technique of the invention has application to other types of sensors, detectors, and devices that do not make use of ferroelectric materials and the pyroelectric effect but exhibit a hysteresis loop output. Particularly, if a certain material exhibits a hysteresis loop response to an input signal, then the multiple signal averaging technique of the invention may be applicable to those types of systems. Another type of sensor may include a magnetic type material exhibiting a hysteresis type loop response to external stimuli, such as strain.

Figure 5:
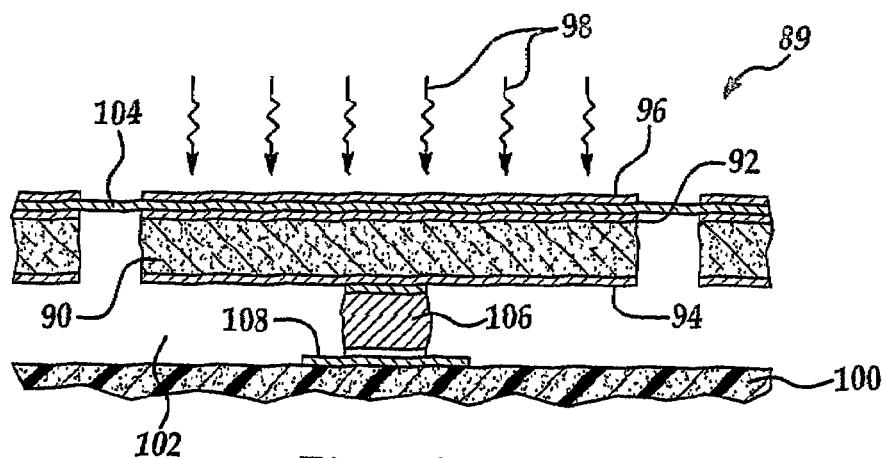
FIG. 5 is a cross section of a known pyroelectric element thermally isolated from a silicon substrate by an air bridge.
Figure 10:
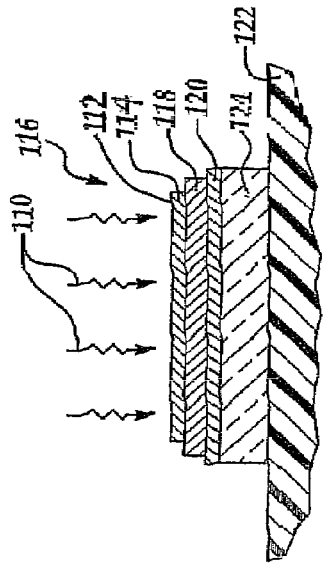
FIG. 10 is a cross section of the element of the active pyroelectric sensor system illustrated without the conventional air bridge shown in FIG. 5.

The design of pyroelectric sensors require consideration of both thermal and electrical circuits, FIG. 5 illustrates a traditional thermal circuit structure and FIG. 10 illustrates the thermal circuit structure of the present invention. To have good signal-to-noise radios, the thermal time constant must be appreciably slower than the electronic time constant.

Referring to FIG. 5, the traditional pyroelectric layer 90 of pyroelectric element 89 is made of any one of the materials previously described and tabled. Layer 90 is disposed between top and bottom capacitive plate 92, 94. An infrared absorber 96 is disposed above the top plate 92 for absorbing slected rays 98 and transferring the heat to the pyroelectric layer 90. A silicon substrate 100 is spaced below and supports the entire array of elements and acts generally as an infinite heat sink. The spacing is traditionally termed an air bridge 102 and in-part reconciles the conflicting demands of electrical connection from element 89 to signal voltage output $V_o$, while at the same time maintaining a high level of thermal isolation of the pyroelectric element 89. To minimize lateral thermal conduction metallic interconnects 104 between elements is restricted to an area much smaller than the element area. Each element 89 is supported and secured electrically to the silicon substrate by a vertical thermal insulator or solder bond 106 which attaches between the lower plate 94 and an input pad 108 by weldable metallization. Unfortunately, use of the air bridge 102 produces numerous manufacturing difficulties as previously described in the Background Section.

Similar to the improvement in signal-to-noise ratio by signal averaging, the sensitivity, p, of the ferroelectric element material is improved or multiplied up by a factor of the number of cycles, N:

$$p(\text{effective}) = N * p(\text{conventional})$$

This effective sensitivity improvement enables the use of ferroelectric materials never before considered for pyroelectric applications. Many of these ferroelectric materials include curie temperatures which far exceed room temperature which is the preferred reference temperature previously described. For example, strontium bismuth tantalate, SBT, as a ferroelectric material has a sensitivity, p, of 0.03 µC/cm$^2$K which is traditionally too low and a curie temperature of 335 degrees celsius which is far too hot to operate as a reference temperature. Multiplying up the sensitivity by a factor of N cycles permits shifting of the reference temperature downward from the curie temperature on the polarization verse temperature curve of FIG. 1. Moreover, the preferred form of SBT is a thin film with a wide range of working temperatures wherein the pyroelectric effect of SBT is substantially linear. Other preferred ferroelectric materials and doping of SBT include barium-bismuth-tantalate and lanthium-bismuth-tantalate wherein derivative of SBT can have the effect of changing the slope of the polarization verse time curve at a given reference temperature to improve signal-to-noise ratios and sensitivity.

Referring to FIG. 10 of the present invention, utilization of the "active" pyroelectric sensor and related pixel switching provides a very fast electronic time constant which can forgive higher thermal time constants not workable for passive pyroelectric sensors. For instance, infrared radiation 110 impinges upon absorber 112 which transfers heat through a platinum capacitive plate 114 of an element 116 for polarization of ferroelectric layer 118. A lower capacitive plate 120 preferably made of platinum flows current as previously described to a charge integration system. The element 116 is thermally isolated from a silicon substrate 122 by a continuous layer or coating of a thermal barrier 124 attaching directly between the capacitive plate 120 and the silicon substrate 122. Preferably, the thermal barrier 124 is spin-on-glass, SOG, or yttria stabilizer zirconia (YSZ). For example, in calculating the thermal time constant of an SOG barrier 124, the thermal time constant equation is:

$$\tau_{ther} = \iota 2/K$$

wherein $\iota$ is thickness and K is the thermal diffusivity. Assuming $\iota=2$ μm, density of silicon dioxide is 87%, thermal conductivity is 0.155 W/m-K and heat capacity (bulk silicon dioxide) is 44.77 J/mol-K, the thermal time constant equals 44 μs. When comparing this to pixel switching of, for example, 10 MHz, the vertical electronic time constant is 400 times faster than the thermal time constant.

From this simple analysis it is evident that a typical 10 μm×10 μm ferroelectric element 116 constructed upon a low density, low thermal conductivity, SOG thermal barrier 124 (such as Dow's XLK) is sufficient so as not to require either a micro-machined air bridge 102 (as shown in FIG. 5) or any other membrane-type structure. This assumes that an "active" pyroelectric sensor is utilized with an external AC power source/signal having a frequency of at least 10 MHz.

Figure 9:
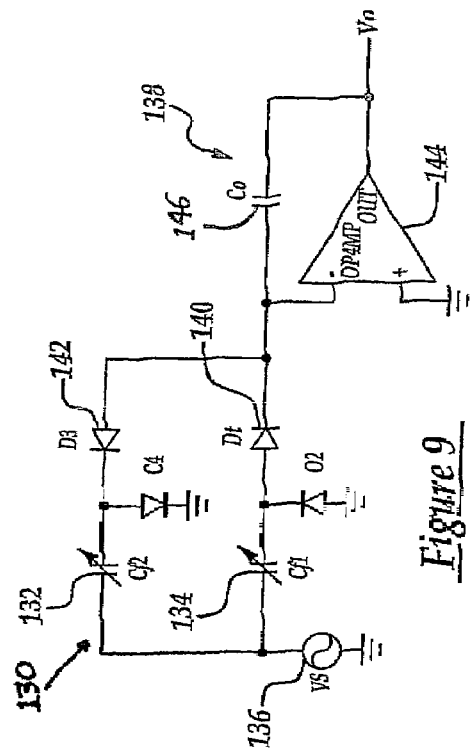
FIG. 9 is a schematic diagram of a modified active pyroelectric sensor system according to the invention.

The active pyroelectric sensor systems 32 and 80 of FIGS. 6 and 8 or of the "active" systems taught in U.S. Pat. No. 6,339,221 can be modified to an active dual element pyroelectric sensor system 130 as shown in FIG. 9 for preventing signal voltage output $V_o$ saturation. System 130 has a reference element 132 configured electrically in parallel with a scene element 134. The reference element 132 has an inherent capacitance $C_{f2}$ and is generally kept in the dark. The scene element 132 has an inherent capacitance $C_{f1}$, and is exposed generally to the scene temperature. An alternating voltage source 136 is configured in series with both the reference and scene elements 132, 134 so that when the externally applied voltage is positive current flowing through scene element 134 and a diode detector 140 is pumped to an output or storage capacitor 137 of a charge integration system 138. Similarly, when the externally applied voltage is negative during the same cycle, current flows back from the output capacitor 146 and into the reference element 132 via a diode detector 142. This returning current acts to integrate the polarization of the reference element 132. An amplifier or summer 144 of the charge integration system 138 determines the difference between polarizations from one cycle to the next and sums the differences over a given time period to optimize the signal-to-noise ratio.

Figure 11:
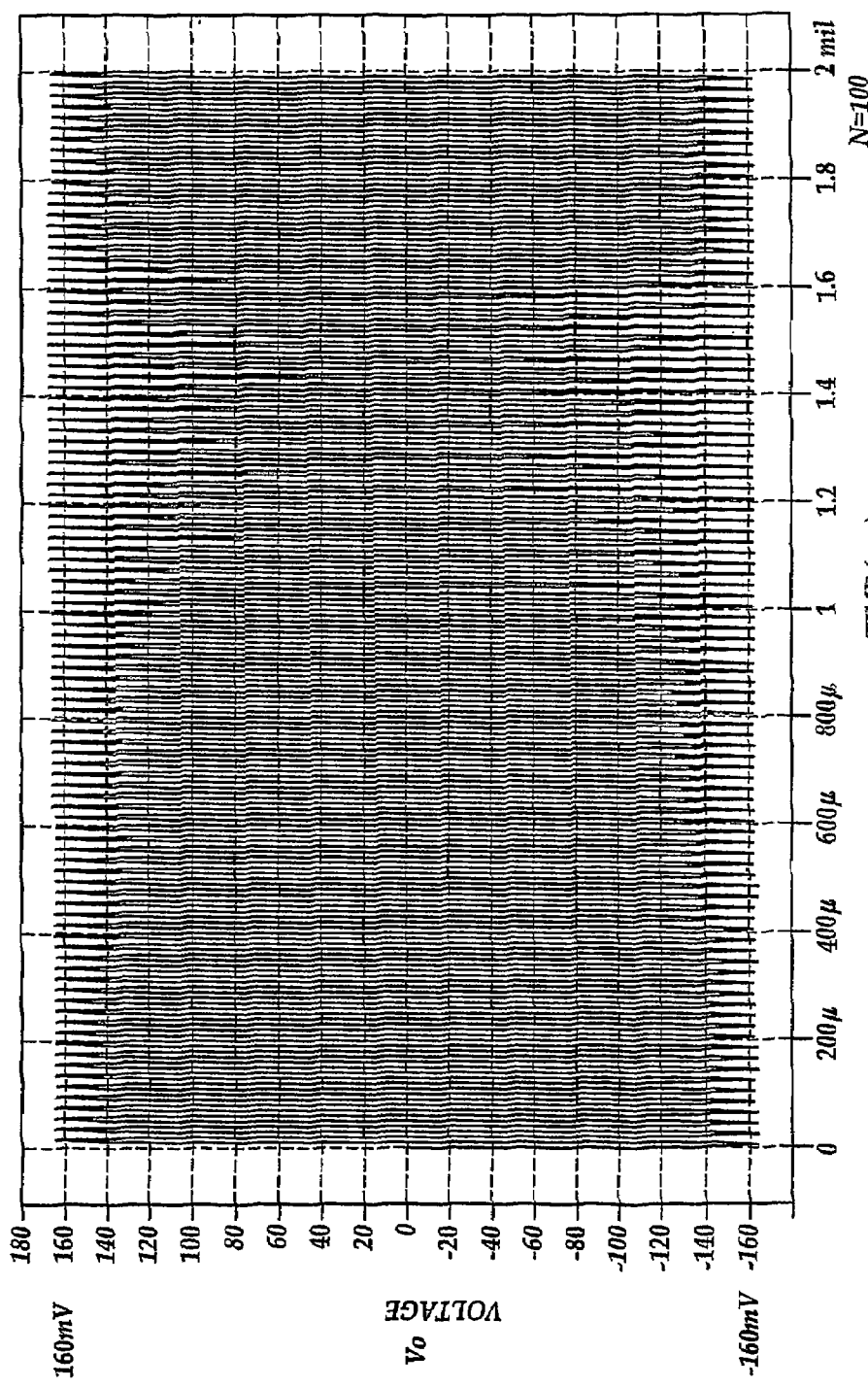
FIG. 11 is a graph of output voltage on a vertical axis and time on a horizontal axis produced by the modified active pyroelectric sensor of FIG. 9, wherein the temperature and polarization of a scene element is equal to the temperature and polarization of a reference element with the polarization being 9.25 uC/cm2 and the number of cycles, N, being 100.
Figure 12:
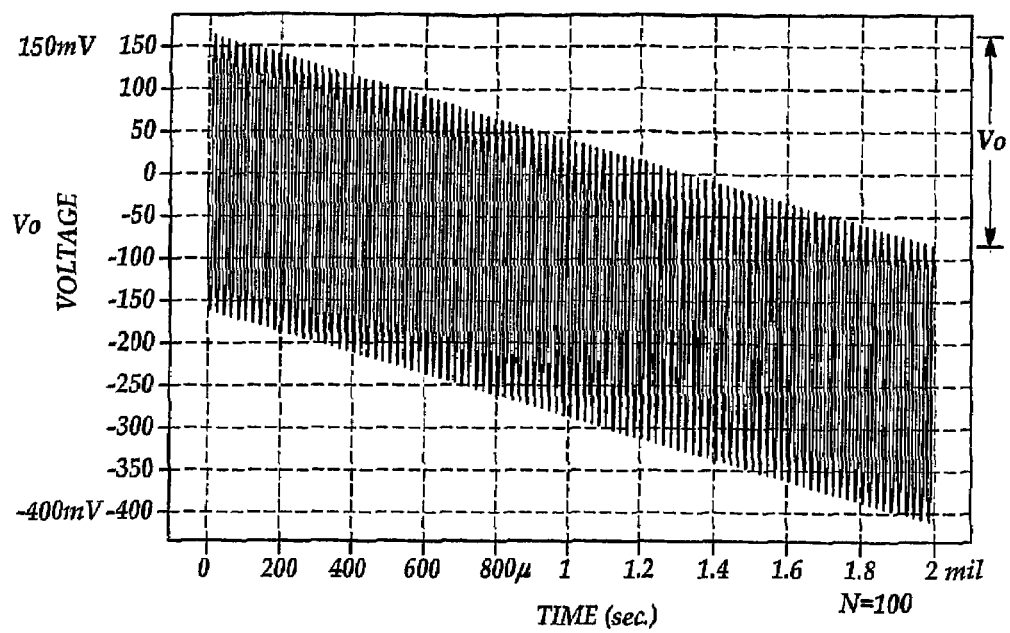
FIG. 12 is a graph similar to FIG. 11 except that the temperature between the scene and reference elements differs by seven degrees Celsius and the polarization of the reference element is reduced to 9.125 uC/cm2.
Figure 13:
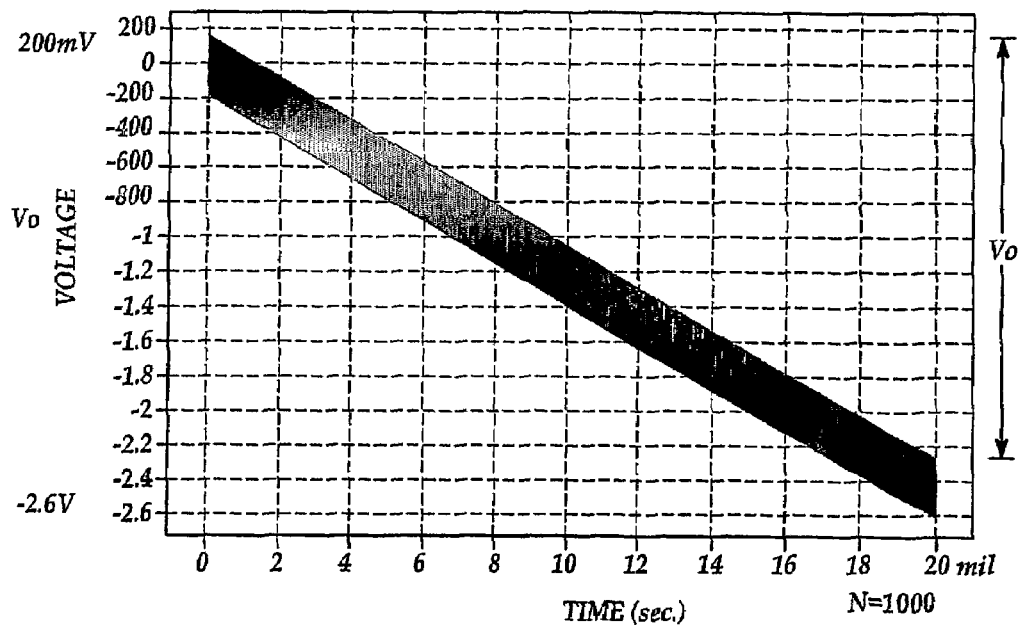
FIG. 13 is a graph similar to FIG. 12 except that the number of cycles is increased to 1000.

FIGS. 11-13 depict simulation results of the active pyroelectric sensor 130 of FIG. 9. In FIG. 11, $C_{f1}$, of scene element 134 and $C_{f2}$ of reference element 132 are under the same temperature and both have the same spontaneous polarization, $P_s=9.25$ uC/cm². Consequently, no output voltage builds up in this case even over one hundred cycles, N=100.

Referring to FIG. 12, the spontaneous polarization of scene element 134 is $P_{s1}=9.25$ uC/cm² and the spontaneous polarization of the reference element 132 is integrated to be $PS_2=9.125$ uC/cm². This difference in polarization corresponds with a seven degree Celsius temperature difference between elements 132, 134. The summer 144 sums a total of 100 differences to produce a signal output voltage $V_o$ of approximately 200 mV.

Referring to FIG. 13, the polarization states remain the same as in FIG. 12 thus the temperature difference is the same. However, time $\tau$, or the window, is increased by a factor of 10 (i.e. from 2 ms to 20 ms) which corresponds to an increase of cycles from N=100 to N=1000. Under this analysis it becomes apparent that the signal voltage output $V_o$, will not saturate as long as it has not reached VDD. The summer 144 sums a total of 1000 differences over $\tau=20$ msec to produce a signal output voltage of approximately 2,300 mV which is greater than a factor of 10, signifying an improvement in the signal-to-noise ratio over FIG. 12 where N=100.

While the forms of the invention herein disclosed constitute presently preferred embodiments many others are possible. It is not limited herein to mention all of the possible equivalent forms or ramifications of the invention. It is understood that the terms used herein are merely descriptive rather than limiting and that various changes may be made without departing from the spirit or scope of the invention.

We claim:

1. A pyroelectric sensor system comprising:
    an alternating voltage source for generating an alternating voltage at a predetermined frequency;
    a pyroelectric scene element responsive to the alternating voltage, said pyroelectric scene element for generating a hysteresis loop charge output in response to the alternating voltage, said alternating voltage driving the pyroelectric scene element over at least a portion of the hysteresis loop charge output of the pyroelectric scene element, said pyroelectric scene element being constructed and arranged so that the alternating voltage causes a polarization reversal of dipoles in the pyroelectric scene element in response to positive and negative changes of the alternating voltage;
    a charge integration system responsive to the charge output from the pyroelectric scene element, said integration system determining an area within the hysteresis loop defined by the hysteresis loop output and generating a signal indicative of the charge output from the pyroelectric scene element;
    a ferroelectric layer of the pyroelectric scene element being selected from a group consisting of strontium-bismuth-tantalate (SBT), barium-bismuth-tantalate, and-lanthium-bismuth-tantalate; and
    the ferroelectric layer being disposed between a first and a second capacitive plate of the pyroelectric scene element.

2. The pyroelectric sensor system set forth in claim 1, wherein the system is an infrared imaging system, and the pyroelectric scene element has an infrared absorber that absorbs infrared radiation directed toward the pyroelectric scene element from a scene.

3. The pyroelectric sensor system set forth in claim 1;
    wherein the alternating voltage is applied to the first capacitive plate so that the alternating voltage causes a polarization reversal of dipoles in the pyroelectric scene element in response to positive and negative changes of the alternating voltage; and wherein the charge integration system is responsive to the charge output from the second capacitive plate of the pyroelectric scene element.

4. The pyroelectric sensor system set forth in claim 3, further comprising:
   a silicon substrate structure acting as a thermal heat sink; and
   a continuous thermal barrier coating attached directly between the second capacitive plate and the silicon substrate, wherein the continuous thermal barrier does not have an air bridge.

5. The pyroelectric sensor system set forth in claim 1, further comprising a ferroelectric reference element configured electrically parallel to the pyroelectric scene element;
   wherein the ferroelectric reference element is responsive to the alternating voltage and generates a hysteresis loop charge output in response to the alternating voltage which drives the ferroelectric reference element over at least a portion of the hysteresis loop output of the ferrorelectric reference element, the ferroelectric reference element being constructed and arranged so that the alternating voltage causes a polarization reversal of dipoles in the ferroelectric reference element in response to positive a negative changes of the alternating voltage; and
   wherein the charge integration system is responsive to the charge output from the ferroelectric reference element, the integration system determining the area within the hysteresis loop output of the ferroelectric reference element defined by the hysteresis loop output of the ferroelectric reference element and generating a signal voltage output indicative of a difference between the hysteresis loop outputs of the pyroelectric scene and ferroelectric reference elements.

6. The pyroelectric sensor system set forth in claim 5, further comprising the charge integration system having an operation amplifier;
   wherein the signal voltage output of the charge integration system is indicative of a plurality of summed differences between the hysteresis loop outputs.

7. The pyroelectric sensor system set forth in claim 6, wherein the number of the plurality of summed differences is equal to the product of a predetermined time period of scene measurement times the frequency of the external AC signal.

8. The pyroelectric sensor system set forth in claim 7, wherein the charge integration system receives a current from the scene element when the external AC signal voltage is positive and returns a current to the ferroelectric reference element for integration of the reference polarization when the external AC signal voltage is negative.

9. The pyroelectric sensor system set forth in claim 5 comprising:
   the charge integration system having an output capacitor;
   the charge integration system having an operation amplifier that is configured in parallel with the output capacitor and acting as a summer of a plurality of summed differences between the hysteresis loop outputs of the scene and reference elements which is indicative of the signal voltage output;
   a scene diode detector for flowing current from the scene element to the charge integration system for charging the output capacitor when the external alternating voltage is positive; and
   a reference diode for flowing current from the charge integration system to the reference element for discharging the output capacitor and integration the reference element polarization when the external alternating voltage is negative.

* * * * *